(12) United States Patent
Long et al.

(10) Patent No.: US 8,758,608 B2
(45) Date of Patent: Jun. 24, 2014

(54) CONTINUOUSLY FLOWING, INNER CIRCULATORY, QUASI-FLUIDIZED-BED REACTOR FOR RESIN ION EXCHANGE AND ADSORPTION

(75) Inventors: Chao Long, Jiangsu (CN); Jun Fan, Jiangsu (CN); Aimin Li, Jiangsu (CN); Chendong Shuang, Jiangsu (CN)

(73) Assignees: Nanjing University (CN); Nanjing University Yancheng Environmental Protection Technology and Engineering Research Institute (CN)

( * ) Notice: Subject to any disclaimer, the term of this patent is extended or adjusted under 35 U.S.C. 154(b) by 0 days.

(21) Appl. No.: 14/117,486

(22) PCT Filed: Nov. 10, 2011

(86) PCT No.: PCT/CN2011/082012
§ 371 (c)(1),
(2), (4) Date: Dec. 23, 2013

(87) PCT Pub. No.: WO2012/155467
PCT Pub. Date: Nov. 22, 2012

(65) Prior Publication Data
US 2014/0131261 A1 May 15, 2014

(30) Foreign Application Priority Data
May 17, 2011 (CN) .......................... 2011 1 0127627

(51) Int. Cl.
*C02F 1/42* (2006.01)
*C02F 1/28* (2006.01)

(52) U.S. Cl.
USPC ........... 210/189; 210/190; 210/197; 210/264; 210/265; 210/269

(58) Field of Classification Search
USPC .................. 210/189, 190, 197, 264, 265, 269
See application file for complete search history.

(56) References Cited

FOREIGN PATENT DOCUMENTS

| CN | 1180769 A | 5/1998 |
|---|---|---|
| CN | 2353739 Y | 12/1999 |
| CN | 201321393 Y | 10/2009 |
| CN | 101708876 A | 5/2010 |
| CN | 101993144 A | 3/2011 |
| CN | 102219285 A | 10/2011 |
| JP | 6-278681 A | 10/1994 |

OTHER PUBLICATIONS

International Search Report; PCT/CN2011/082012; Int'l File Date: Nov. 10, 2011; Nanjing University et al., 3 pgs.
State Intellectual Property Office of the People's Republic of China, Application No. 201110127627.X, First Office Action dated Feb. 19, 2012, 8 pgs.

*Primary Examiner* — Chester Barry
(74) *Attorney, Agent, or Firm* — Schmeiser, Olsen & Watts, LLP

(57) ABSTRACT

A continuously flowing, inner circulatory, quasi-fluidized-bed reactor for resin ion exchange and adsorption. The reactor comprises a main body casing, an inclined pipe separator, an outlet weir, an inlet pipe, an outlet pipe, a reducing fluidization tank, a guide plate, a resin regeneration tank, a resin discharge pipe, and a return pipe for regenerated resin and a distributing ejector. The reactor is particularly suitable for advanced treatment of supply water, wastewater, biochemical effluent and reclaimed water by using (magnetic) powder resin.

6 Claims, 1 Drawing Sheet

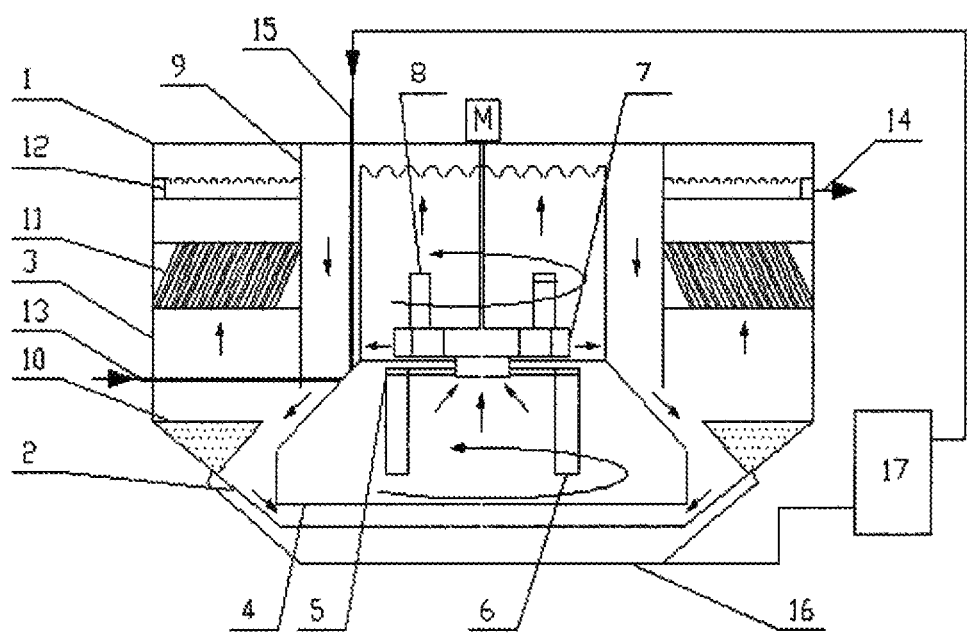

CONTINUOUSLY FLOWING, INNER CIRCULATORY, QUASI-FLUIDIZED-BED REACTOR FOR RESIN ION EXCHANGE AND ADSORPTION

FIELD OF TECHNOLOGY

The present invention relates to a device for resin ion exchange and adsorption, specifically to a device that adopts continuously flowing, inner circulatory, quasi-fluidized bed for resin ion exchange and adsorption, particularly to a continuously flowing, inner circulatory, quasi-fluidized-bed reactor that uses 75-200 μm solid or magnetic powder resin for water advanced treatment.

BACKGROUND

In advanced treatment of supply water, wastewater and biochemical effluent, ion exchange and adsorption resin is widely adopted to concentrate organics and inorganics, and then separate them from water so that the objectives of water treatment, such as decolorization, deodorization, softening and removal of trace organics or heavy metals can be obtained. However, the resin ion exchange devices currently used in this field have many defects, such as complicated pretreatment procedures, large resin consumption, large equipment investment and high operating cost; in addition, it is difficult to realize continuous treatment with one single device, and a large amount of resin regeneration fluid is required due to the poor regeneration efficiency. The appearance of a new type of resin makes it possible to overcome these defects. This so-called powder resin refers to a (magnetic) solid material made of acrylic polymer with 75-200 μm in size. It has rich porous structure and ionic groups and therefore bears such functions as electrochemical adsorption and ion exchange simultaneously; many new types of (magnetic) powder resin have smaller particle size, larger specific surface area and better kinetic performance. In practical application, the powder resin is often firstly mixed with wastewater through agitation for a period of time, and then separated from the water so that it can remove the organics and inorganics from the wastewater through exchange and adsorption. Reactors adopting powder resin in water treatment presents such advantages as shorter treatment time, lower consumption of resin, higher anti-pollution performance, longer service life and smaller amount of desorption fluid. But, since the (magnetic) powder resin has smaller particle size and lower relative density, the adoption of traditional fixed beds or suspension beds will cause strong bed resistance, jamming or even break-up of resin particles, and when conducting the backwash procedure, the resin tends to be brought out of the reactor; in addition, as a single fixed bed or suspension bed cannot realize continuous operation of the powder resin, it severely damages the powder resin's performance in water treatment. Therefore, it is of great necessity to develop a new resin reactor that gives full consideration to the properties of the (magnetic) powder resin, such as smaller particle size, lower density and better kinetic performance, so that it can bring the advantages of this new type of resin into full play.

Currently, MIEX® resin and its application method developed by Orica Company of Australia have been extensively used in water treatment. It adopts acrylic strong basic anion exchange resin to separate a variety of anions (including nitrates, sulfates, phosphates, arsenates) and soluble organic pollutants from water by means of mechanic agitation and inclined pipe separation. In China, a hydraulic ejecting magnetic resin reactor developed by Nanjing CEC Environmental Protection Co., Ltd also appeared on the market of advanced water treatment. However, traditional continuous-stirred reactors are used in both cases, which leads to homogeneous distribution of resin within the whole reactor. As a result, in both cases, the consumption of resin is very large and the recovery of resin is difficult. It is of great necessity to develop a new reactor that can overcome these defects.

SUMMARY

In view of the fact that the (magnetic) powder resin has such properties as small particle size, low density and special kinetic performance, the present invention provides a continuously flowing, inner circulatory, quasi-fluidized-bed reactor for resin ion exchange and adsorption; it can fully exploit the advantages of the (magnetic) powder resin and reach a continuous separation-regeneration mode of operation for the reaction system. With the (magnetic) powder resin, the reactor disclosed in the present invention can be used not only in supply water treatment but also in advanced treatment of wastewater, biochemical effluent and reclaimed water.

A continuously flowing, inner circulatory, quasi-fluidized-bed reactor for resin ion exchange and adsorption, comprising a main body casing, an inclined pipe separator, an outlet weir, an inlet pipe, an outlet pipe, a reducing fluidization tank, a guide plate, a resin regeneration tank, a resin discharge pipe, a return pipe for regenerated resin and a distributing ejector; the inlet pipe and the distributing ejector are designed at the bottom of the main body casing; the distributing ejector connects to the inlet pipe on one side, and to the lower end of the reducing fluidization tank on the other side; the guide plate is placed between the main body casing and the reducing fluidization tank, and the inclined pipe separator is installed between the main body casing and the guide plate; the outlet weir is located above the inclined pipe separator and connects to the outlet pipe; the resin regeneration tank connects to the lower part of the reactor via the resin discharge pipe and to the reducing fluidization tank via the return pipe for the regenerated resin.

The upper $2/3 \sim 3/4$ part of the main body casing is a cylinder with an open upper end; the lower $1/3 \sim 1/4$ part of the main body casing is an inverted cone, the slope of which is $35° \pm 10°$. The reducing fluidization tank is a hollow rotary assembly concentric with the reactor's main body; its bottom is 0.2~0.8 m above the bottom of the main body casing while its top is 0.5~1.0 m below the top of the main body casing; the lower $1/4 \sim 1/3$ part of the reducing fluidization tank is a hollow cylinder, while the upper $3/4 \sim 2/3$ part of it is a hollow conical frustum; the diameter of its cylindrical part is $1/5 \sim 1/3$ of the reactor's outer diameter, so is the diameter of the lower end of the conical frustum; the diameter of the upper end of the conical frustum is $1/4 \sim 1/2$ of the reactor's outer diameter; in the middle of the reducing fluidization tank is a propeller-shaped agitator, and the diameter of the propeller is $1/4 \sim 1/3$ of the diameter of its cylindrical part; the rotation rate of the agitator is adjustable between 10 to 60 rpm.

The distributing ejector consists of a water distributor and an ejector designed with 2~4 injecting pipes, which are evenly located under the bottom of the cylindrical part of the reducing fluidization tank, with 0.2~1.0 m in between; the diameter of each ejecting pipe is $1/20 \sim 1/8$ of the diameter of the cylindrical part of the reducing fluidization tank; the angle between the axis of each ejecting pipe and the axis of the reducing fluidization tank is $10° \sim 60°$.

The guide plate is a hollow cylinder concentric with the reactor's main body; its diameter is ½~¾ of the diameter of the reactor's main body; its upper end shares the same horizontal level with that of the reactor's main body, and its lower end is 1.0~1.5 m above the bottom of the reactor.

The outlet weir consists of 4~12 weir units, installed like wheel spokes between the main body casing and the guide plate; it is 0.3~0.5 m below the upper end of the reactor, and the weir units are designed in serrated or perforated form.

The inclined pipe separator consists of a multiplicity of inclined pipes installed between the main body casing and the guide plate, 1.5~3.5 m below the upper end of the reactor; the diameter of each inclined pipe is 50~80 mm; each pipe has a 45°~60° inclination angle and is 0.8 m~1.2 m in length; the surface loading rate of the inclined pipe separator is 3~6 $m^3/(m^2 \cdot h)$.

In comparison with the prior art, the present invention has following beneficial effects:
(1) the design of the reactor is particularly suitable for the ion exchange and adsorption reaction using (magnetic) powder resin;
(2) the volume of the inner circulation can be controlled through adjusting the inflow volume of the distributing ejector and the rotation rate of the agitator; meanwhile, the design of the reactor ensures highly efficient contact between (magnetic) powder resin and water;
(3) the special design of the reducing fluidization tank maintains most of (magnetic) powder resin within the reducing fluidization tank, which consequently ensures sufficient contact between resin and water; as a result, the total reaction time is shortened, and the total resin consumption is reduced; the design of the reducing fluidization tank also reduces the total occupation space of the whole reaction system;
(4) the manufacturing cost of the reactor disclosed in the present invention keeps at a low level as its main body casing is an open container working under the normal pressure, and it can be made with metals, organic composite materials or steel-reinforced concrete;
(5) the operating cost of the reactor disclosed in the present invention keeps at a low level as the resin regeneration tank guarantees high efficiency in separating (magnetic) powder resin from water and a lower loss rate of resin;
(6) all components of the reactor disclosed in the present invention are designed as an organic whole: the reactor works in an continuous way; the deactivated resin can be discharged out for regeneration and the regenerated resin can also flow back to the reactor without turning off the whole treatment system; the efficiency of the whole system is therefore greatly increased;
(7) the design of the whole reactor is simple, requiring no complicated inflow pipelines or backwash pipelines; it is easy and convenient to operate the reactor as it works in an automatic way.

BRIEF DESCRIPTION

FIG. 1 is the structural diagram of the continuously flowing, inner circulatory, quasi-fluidized-bed reactor for resin ion exchange and adsorption disclosed in the present invention, including:

main body casing 1, cylindrical upper part 2, conical lower part 3, ejector 4, water distributor 5, reducing fluidization tank 6, guide plate 7, inclined pipe separator 8, outlet weir 9, agitator 10, inlet pipe 11, outlet pipe 12, clean water area 13, resin regeneration tank 14, resin discharge pipe 15, and return pipe for regenerated resin.

DETAILED DESCRIPTION

A continuously flowing, inner circulatory, quasi-fluidized-bed reactor for resin ion exchange and adsorption, comprising a main body casing 1, an inclined pipe separator 8, an outlet weir 9, an inlet pipe 11 and an outlet pipe 12, wherein it also includes a reducing fluidization tank 6, a guide plate 7, a resin regeneration tank 14, a resin discharge pipe 15, a return pipe for regenerated resin 16 and a distributing ejector; the inlet pipe and the distributing ejector are designed at the bottom of the main body casing 1; the distributing ejector connects to the inlet pipe 11 on one side, and to the lower end of the reducing fluidization tank 6 concentrically located inside the main body casing 1 on the other side; the guide plate 7 is placed between the main body casing 1 and the reducing fluidization tank 6, and the inclined pipe separator 8 is installed between the main body casing 1 and the guide plate 7; the outlet weir 9 is located above the inclined pipe separator 8 and connects to the outlet pipe 12; the resin regeneration tank 14 connects to the lower part of the reactor via the resin discharge pipe 15 and to the reducing fluidization tank 6 via the return pipe for the regenerated resin 16.

Embodiment 1

The main body casing 1 of the reactor is made of steel; its cylindrical upper part 2 is 8.5 m in diameter and 4.5 m in height, while its conical lower part 3 is 2.5 m in height with a slope of 35°; the reducing fluidization tank is a hollow rotary assembly concentric with the reactor's main body; its bottom is 0.6 m above the bottom of the main body casing 1 while its top is 0.6 m below the top of the main body casing 1; the lower ⅓ part of the reducing fluidization tank is a hollow cylinder, while the upper ⅔ part of it is a hollow conical frustum; the cylindrical part of the reducing fluidization tank is 1.5 m in diameter, so is the diameter of the lower end of the conical frustum; the diameter of the upper end of the conical frustum is 4.25 m; the filling volume of (magnetic) powder resin is 8% of the total volume of the reducing fluidization tank and the particle size of the (magnetic) powder resin is 75~200 μm; in the middle of the reducing fluidization tank is a propeller-shaped agitator, and the diameter of the propeller is ⅓ of the diameter of the cylindrical part of the reducing fluidization tank; the rotation rate of the agitator is adjustable between 10 to 60 rpm.

The distributing ejector consists of the water distributor 5 and the ejector 4 designed with 3 injecting pipes, which are evenly located under the bottom of the cylindrical part of the reducing fluidization tank, with 0.6 m in between; the diameter of each ejecting pipe is 1/10 of the diameter of the cylindrical part of the reducing fluidization tank; the angle between the axis of each ejecting pipe and the axis of the reducing fluidization tank is 30°.

The water is introduced into the reactor through the inlet pipe 11; it then flows through the water distributor and is ejected into the reducing fluidization tank 6 by the ejector; the intensity of mixing reaction and the rising speed of liquid in the reducing fluidization tank 6 can be controlled by adjusting the inflow rate through the valve on each ejecting pipe and the rotation rate of the agitator; adjusting the reflux rate of the resin simultaneously and the resin, along with the upgoing water flow, rises up vortically from the bottom of the reducing fluidization tank 6; under the propelling of the agitator 10, the water level is further raised, however, with the increase of the diameter of the upper part of the reducing fluidization tank 6, the flow rate of the liquid gradually slows down, which causes most of resin to remain within the reducing fluidization tank 6 (namely, the reaction between resin and substances in water mainly takes place within the said tank); meanwhile, the agitation also results in a negative pressure area around the bottom of the reducing fluidization tank 6 and the bottom of the reactor; which sucks the (magnetic) powder resin precipitating thereon into the reducing fluidization tank 6 again and further increases the efficiency of contact reaction between the resin and substances in the water; controlling the flow rate of the rising water within the cylindrical part of the reducing fluidization tank 6 at 10 m/h and that at the highest cross-section of the conical frustum at 2 m/h; keeping the hydraulic retention time within the reducing fluidization tank at 40 min, and both organic and inorganic substances in the water will be adsorbed upon the surface of resin through ion exchange and adsorption reaction.

The guide plate 7 is a hollow cylinder concentric with the reactor's main body; its diameter is ⅔ of the diameter of the reactor's main body; its upper end shares the same horizontal level with that of the reactor's main body, and its lower end is 1.0 m above the bottom of the reactor; the guide plate 7 leads the water-resin mixture flowing out of the reducing fluidization tank 6 to the lower part of the reactor, so that the resin can quickly precipitate there and flow back into the reducing fluidization tank.

The inclined pipe separator 8 consists of a multiplicity of inclined pipes installed between the main body casing 1 and the guide plate 7, 2.0 m below the upper end of the reactor; the diameter of each inclined pipe is 60 mm; each pipe has a 60° inclination angle and is 1.0 m in length; the surface loading rate of the inclined pipe separator is 4 m$^3$/(m$^2$·h); the inclined pipe separator 8 can further enhance the precipitation of the resin; the area between the inclined pipe separator and the outlet weir is called the clean water 13, and the water flowing out of the inclined pipe contains no resin.

The outlet weir consists of 6 weir units, installed like wheel spokes between the main body casing 1 and the guide plate 7; it is 0.3~0.5 m below the upper end of the reactor, and the weir units are designed in perforated form; the treated water is collected by the outlet weir 9 and then flows out of the reactor via the outlet pipe 12; the flow rate of the water in the outlet weir is not more than 1.0 (m/h).

The deactivated resin can be channeled out through the resin discharge pipe 15 located at the lower part of the reactor to the resin regeneration tank 14 for regeneration; the regenerated resin flows back into the reducing fluidization tank 6 through the return pipe 16; the regeneration rate of resin is adjustable in accordance with the quality of inflow water and other practical considerations, normally, 10% of the regeneration rate is recommended.

The reactor disclosed in this embodiment was adopted for advanced treatment of biochemical effluent created by a dyeing plant; the water quality before being treated with (magnetic) powder resin and the treatment volume are shown in the following table:

| | quality of inflow effluent before treatment | | | | |
|---|---|---|---|---|---|
| | CODcr (mg/L) | total nitrogen (mg/L) | total phosphorus (mg/L) | chromaticity (times) | inflow volume (m$^3$/h) |
| biochemical effluent | 80~100 | 10~12 | 0.2~0.3 | 80~120 | 120 |

The said effluent was first mixed with the regenerated resin and then introduced into the reducing fluidization tank of the reactor; the filling volume of the powder resin was 5% of the total volume of the reducing fluidization tank; the retention time of the effluent in the reducing fluidization tank was 40 min; adjusting the rotation rate of the agitator to ensure sufficient contact between the resin and the effluent; meanwhile, keeping the flow rate of liquid flowing out of the conical frustum at 2 m/h.

Part of resin was channeled out from the lower part of the reactor for dynamic regeneration in the regeneration tank, where the resin was regenerated by 10% NaCl solution; the regenerated resin was then introduced back to the reducing fluidization tank of the reactor; the regeneration rate of the resin was controlled at 10% of its total volume in the reactor; keeping the amount of resin channeled back the same with that discharged out.

The quality of water treated by this reactor was CODcr: 35~45 mg/L; total nitrogen: 5~8 mg/L; total phosphorus: 0.1~0.2 mg/L; chromaticity: 5~10 times.

Embodiment 2

The main body casing 1 of the reactor is made of steel; its upper ¾ part is an open cylinder 2 that is 8.5 m in diameter and 4.5 m in height, while its lower ¼ part is an inverted cone 3 that is 2.5 m in height with a slope of 45°; the reducing fluidization tank 6 is a hollow rotary assembly concentric with the reactor's main body; its bottom is 0.8 m above the bottom of the main body casing 1 while its top is 1.0 m below the top of the main body casing 1; the lower ⅓ part of the reducing fluidization tank is a hollow cylinder, while the upper ⅔ part of it is a hollow conical frustum; the cylindrical part of the reducing fluidization tank is 3 m in diameter, so is the diameter of the lower end of the conical frustum; the diameter of the upper end of the conical frustum is 4.25 m; the filling volume of (magnetic) powder resin is 10% of the total volume of the reducing fluidization tank and the particle size of the (magnetic) powder resin is 75~200 µm; in the middle of the reducing fluidization tank is a propeller-shaped agitator, and the diameter of the propeller is ⅓ of the diameter of the cylindrical part of the reducing fluidization tank; the rotation rate of the agitator is adjustable between 10 to 60 rpm.

The distributing ejector consists of the water distributor 5 and the ejector 4 designed with 4 injecting pipes, which are evenly located under the bottom of the cylindrical part of the reducing fluidization tank, with 1.0 m in between; the diameter of each ejecting pipe is ⅛ of the diameter of the cylindrical part of the reducing fluidization tank; the angle between the axis of each ejecting pipe and the axis of the reducing fluidization tank is 60°.

The water is introduced into the reactor through the inlet pipe 11; it then flows through the water distributor and is ejected into the reducing fluidization tank 6 by the ejector; the intensity of mixing reaction and the rising speed of liquid in the reducing fluidization tank 6 can be controlled by adjusting the inflow rate through the valve on each ejecting pipe and the rotation rate of the agitator; adjusting the reflux rate of the resin simultaneously and the resin, along with the upgoing water flow, rises up vortically from the bottom of the reducing fluidization tank 6; under the propelling of the agitator 10, the water level is further raised, however, with the increase of the diameter of the upper part of the reducing fluidization tank 6, the flow rate of the liquid gradually slows down, which causes most of resin to remain within the reducing fluidization tank 6 (namely, the reaction between resin and substances in water mainly takes place within the said tank); meanwhile, the agitation also results in a negative pressure area around the bottom of the reducing fluidization tank 6 and the bottom of the reactor; which sucks the (magnetic) powder resin precipitating thereon into the reducing fluidization tank 6 and further increases the efficiency of contact reaction between the resin and substances in the water; controlling the flow rate of the rising water within the cylindrical part of the reducing fluidization tank 6 at 2 m/h and that at the highest cross-section of the conical frustum at 1 m/h; keeping the hydraulic retention time within the reducing fluidization tank at 0.3 h, and both organic and inorganic substances in the water will be adsorbed upon the surface of resin through ion exchange and adsorption reaction.

The guide plate 7 is a hollow cylinder concentric with the reactor's main body; its diameter is ¾ of the diameter of the reactor's main body; its upper end shares the same horizontal level with that of the reactor's main body, and its lower end is 1.5 m above the bottom of the reactor; the guide plate 7 leads the water-resin mixture flowing out of the reducing fluidization tank 6 to the lower part of the reactor, so that the resin can quickly precipitate there and flow back into the reducing fluidization tank.

The inclined pipe separator 8 consists of a multiplicity of inclined pipes installed between the main body casing 1 and the guide plate 7, 2.0 m below the upper end of the reactor; the diameter of each inclined pipe is 80 mm; each pipe has a 60° inclination angle and is 1.2 m in length; the surface loading rate of the inclined pipe separator is 6 m³/(m²·h); the inclined pipe separator 8 can further enhance the precipitation of the resin; the area between the inclined pipe separator and the outlet weir is called the clean water 13, and the water flowing out of the inclined pipe contains no resin.

The outlet weir consists of 4~12 weir units, installed like wheel spokes between the main body casing 1 and the guide plate 7; it is 0.3~0.5 m below the upper end of the reactor, and the weir units are designed in serrated form; the treated water is collected by the outlet weir 9 and then flows out of the reactor via the outlet pipe 12; the flow rate of the water in the outlet weir is not more than 1.0 (m/h).

The deactivated resin can be channeled out through the resin discharge pipe 15 located at the lower part of the reactor to the resin regeneration tank 14 for regeneration; the regenerated resin flows back into the reducing fluidization tank 6 through the return pipe 16; the regeneration rate of resin is adjustable in accordance with the quality of inflow water and other practical considerations, normally, 20% of the regeneration rate is recommended.

The reactor disclosed in this embodiment was adopted for advanced treatment of biochemical effluent created by a dyeing plant; the water quality before being treated with (magnetic) powder resin and the treatment volume are shown in the following table:

| | quality of inflow effluent before treatment | | | | |
|---|---|---|---|---|---|
| | CODcr (mg/L) | total nitrogen (mg/L) | total phosphorus (mg/L) | chromaticity (times) | inflow volume (m³/h) |
| biochemical effluent | 80~100 | 10~12 | 0.2~0.3 | 80~120 | 120 |

The said effluent was first mixed with the regenerated resin and then introduced into the reducing fluidization tank of the reactor; the filling volume of the powder resin was 5% of the total volume of the reducing fluidization tank; the retention time of the effluent in the reducing fluidization tank was 30 min; adjusting the rotation rate of the agitator to ensure sufficient contact between the resin and the effluent; meanwhile, keeping the flow rate of liquid flowing out of the conical frustum at 2 m/h.

Part of resin was channeled out from the lower part of the reactor for dynamic regeneration in the regeneration tank, where the resin was regenerated by 10% NaCl solution; the regenerated resin was then introduced back to the reducing fluidization tank of the reactor; the regeneration rate of the resin was controlled at 10% of its total volume in the reactor; keeping the amount of resin channeled back the same with that discharged out.

The quality of water treated by this reactor was CODcr: 50~60 mg/L; total nitrogen: 6~10 mg/L; total phosphorus: 0.1~0.2 mg/L; chromaticity: 15~30 times.

Embodiment 3

The main body casing 1 of the reactor is made of steel; its upper ⅔ part is an open cylinder 2 that is 8.5 m in diameter and 4.5 m in height, while its lower ⅓ part is an inverted cone 3 that is 1.5 m in height with a slope of 25°; the reducing fluidization tank 6 is a hollow rotary assembly concentric with the reactor's main body; its bottom is 0.2 m above the bottom of the main body casing 1 while its top is 0.5 m below the top of the main body casing 1; the lower ¼ part of the reducing fluidization tank is a hollow cylinder, while the upper ¾ part of it is a hollow conical frustum; the diameter of the cylindrical part of the reducing fluidization tank is ⅓ of the reactor's outer diameter, so is the diameter of the lower end of the conical frustum; the diameter of the upper end of the conical frustum is ¼ of the reactor's outer diameter; the filling volume of (magnetic) powder resin is 2% of the total volume of the reducing fluidization tank and the particle size of the (magnetic) powder resin is 75~200 μm; in the middle of the reducing fluidization tank is a propeller-shaped agitator, and the diameter of the propeller is ¼ of the diameter of the cylindrical part of the reducing fluidization tank; the rotation rate of the agitator is adjustable between 10 to 60 rpm.

The distributing ejector consists of the water distributor 5 and the ejector 4 designed with 2 injecting pipes, which are evenly located under the bottom of the cylindrical part of the reducing fluidization tank, with 0.2 m in between; the diameter of each ejecting pipe is 1/20 of the diameter of the cylindrical part of the reducing fluidization tank; the angle between the axis of each ejecting pipe and the axis of the reducing fluidization tank is 10°.

The water is introduced into the reactor through the inlet pipe 11; it then flows through the water distributor and is ejected into the reducing fluidization tank 6 by the ejector; the intensity of mixing reaction and the rising speed of liquid in the reducing fluidization tank 6 can be controlled by adjusting the inflow rate through the valve on each ejecting pipe and the rotation rate of the agitator; adjusting the reflux rate of the resin simultaneously and the resin, along with the upgoing water flow, rises up vertically from the bottom of the reducing fluidization tank 6; under the propelling of the agitator 10, the water level is further raised, however, with the increase of the diameter of the upper part of the reducing fluidization tank 6, the flow rate of the liquid gradually slows down, which causes most of resin to remain within the reducing fluidization tank 6 (namely, the reaction between resin and substances in water mainly takes place within the said tank); meanwhile, the agitation also results in a negative pressure area around the bottom of the reducing fluidization tank 6 and the bottom of the reactor; which sucks the (magnetic) powder resin depositing therein into the reducing fluidization tank 6 and further increases the efficiency of contact reaction between the resin and substances in the water; controlling the flow rate of the rising water within the cylindrical part of the reducing fluidization tank 6 at 20 m/h and that at the highest cross-section of the conical frustum at 5 m/h; keeping the hydraulic retention time within the reducing fluidization tank at 1.0 h, and both organic and inorganic substances in the water will be adsorbed on the surface of resin through ion exchange and adsorption reaction.

The guide plate 7 is a hollow cylinder concentric with the reactor's main body; its diameter is ½ of the diameter of the reactor's main body; its upper end shares the same horizontal level with that of the reactor's main body, and its lower end is 1.0 m above the bottom of the reactor; the guide plate 7 leads the water-resin mixture flowing out of the reducing fluidization tank 6 to the lower part of the reactor, so that the resin can quickly precipitate there and flow back into the reducing fluidization tank.

The inclined pipe separator 8 consists of a multiplicity of inclined pipes installed between the main body casing 1 and the guide plate 7, 1.5 m below the upper end of the reactor; the diameter of each inclined pipe is 50 mm; each pipe has a 45° inclination angle and is 0.8 m in length; the surface loading rate of the inclined pipe separator is 3 m$^3$/(m$^2$·h); the inclined pipe separator 8 can further enhance the precipitation of the resin; the area between the inclined pipe separator and the outlet weir is called the clean water 13, and the water flowing out of the inclined pipe contains no resin.

The outlet weir consists of 4~12 weir units, installed like wheel spokes between the main body casing 1 and the guide plate 7; it is 0.3 m below the upper end of the reactor, and the weir units are designed in serrated form; the treated water is collected by the outlet weir 9 and then flows out of the reactor via the outlet pipe 12; the flow rate of the water in the outlet weir is not more than 1.0 (m/h).

The deactivated resin can be channeled out through the resin discharge pipe 15 located at the lower part of the reactor to the resin regeneration tank 14 for regeneration; the regenerated resin flows back into the reducing fluidization tank 6 through the return pipe 16; the regeneration rate of resin is adjustable in accordance with the quality of inflow water and other practical considerations, normally, 5% of the regeneration rate is recommended.

The reactor disclosed in this embodiment was adopted for advanced treatment of biochemical effluent created by a dyeing plant; the water quality before being treated with (magnetic) powder resin and the treatment volume are shown in the following table:

| | quality of inflow effluent before treatment | | | | |
|---|---|---|---|---|---|
| | CODcr (mg/L) | total nitrogen (mg/L) | total phosphorus (mg/L) | chromaticity (times) | inflow volume (m$^3$/h) |
| biochemical effluent | 80~100 | 10~12 | 0.2~0.3 | 80~120 | 120 |

The said effluent was first mixed with the regenerated resin and then introduced into the reducing fluidization tank of the reactor; the filling volume of the powder resin was 5% of the total volume of the reducing fluidization tank; the retention time of the effluent in the reducing fluidization tank was 1 h; adjusting the rotation rate of the agitator to ensure sufficient contact between the resin and the effluent; meanwhile, keeping the flow rate of liquid flowing out of the conical frustum at 20 m/h.

Part of resin was channeled out from the lower part of the reactor for dynamic regeneration in the regeneration tank, where the resin was regenerated by 10% NaCl solution; the regenerated resin was then introduced back to the reducing fluidization tank of the reactor; the regeneration rate of the resin was controlled at 10% of its total volume in the reactor; keeping the amount of resin channeled back the same with that discharged out.

The quality of water treated by this reactor was CODcr: 55~65 mg/L; total nitrogen: 5~9 mg/L; total phosphorus: 0.1~0.2 mg/L; chromaticity: 10~15 times.

What is claimed is:

1. A continuously flowing, inner circulatory, quasi-fluidized-bed reactor for resin ion exchange and adsorption, comprising:
    a main body casing, an inclined pipe separator, an outlet weir, an inlet pipe and an outlet pipe, a reducing fluidization tank, a guide plate, a resin regeneration tank, a resin discharge pipe, a return pipe for regenerated resin and a distributing ejector;
    wherein the inlet pipe and the distributing ejector are designed at a bottom of the main body casing; the distributing ejector connects to the inlet pipe on one side, and to a lower end of the reducing fluidization tank concentrically located inside the main body casing on the other side; the guide plate is placed between the main body casing and the reducing fluidization tank, and the inclined pipe separator is installed between the main body casing and the guide plate; the outlet weir is located above the inclined pipe separator and connects to the outlet pipe; the resin regeneration tank connects to a lower part of the reactor via the resin discharge pipe and to the reducing fluidization tank via the return pipe for the regenerated resin;
    wherein an upper ⅔~¾ part of the main body casing is a cylinder with an open upper end; a lower ⅓~¼ part of the main body casing is an inverted cone, the slope of which is 35°±10°;
    wherein the reducing fluidization tank is a hollow rotary assembly concentric with a main body of the reactor; a bottom of the reducing fluidization tank is 0.2~0.8 m above a bottom of the main body casing while a top is 0.5~1.0 m below a top of the main body casing; a lower ¼~⅓ part of the reducing fluidization tank is a hollow cylinder, while an upper ¾~⅔ part of the reducing fluidization tank is a hollow conical frustum; a diameter of the cylindrical part is ⅕~⅓ of a diameter of the reactor, so is a diameter of a lower end of the conical frustum; a diameter of an upper end of the conical frustum is ¼~½ of the outer diameter of the reactor.

2. A continuously flowing, inner circulatory, quasi-fluidized-bed reactor for resin ion exchange and adsorption as defined in claim 1, wherein the distributing ejector consists of a water distributor and an ejector designed with 2~4 injecting pipes, which are evenly located under the bottom of the cylindrical part of the reducing fluidization tank, with 0.2~1.0 m in between; a diameter of each ejecting pipe is 1/20~⅛ of the diameter of the cylindrical part of the reducing fluidization tank; an angle between an axis of each ejecting pipe and an axis of the reducing fluidization tank is 10°~60°.

3. A continuously flowing, inner circulatory, quasi-fluidized-bed reactor for resin ion exchange and adsorption as defined in claim 1, wherein in a middle of the reducing fluidization tank is a propeller-shaped agitator, and a diameter of its propeller is ¼~⅓ of the diameter of its cylindrical part of the reducing fluidization tank; a rotation rate of the agitator is adjustable between 10 to 60 rpm.

4. A continuously flowing, inner circulatory, quasi-fluidized-bed reactor for resin ion exchange and adsorption as defined in claim 1, wherein the guide plate is a hollow cylinder concentric with the main body of the reactor; a diameter of the guide plate is ½~¾ of the diameter of the main body of the reactor; an upper end of the guide plate shares the same horizontal level with that of the main body of the reactor, and a lower end is 1.0~1.5 m above the bottom of the reactor.

5. A continuously flowing, inner circulatory, quasi-fluidized-bed reactor for resin ion exchange and adsorption as defined in claim 1, wherein the outlet weir consists of 4~12 weir units, installed like wheel spokes between the main body casing and the guide plate; the outlet weir being 0.3~0.5 m below the upper end of the reactor, and the weir units are designed in serrated or perforated form.

6. A continuously flowing, inner circulatory, quasi-fluidized-bed reactor for resin ion exchange and adsorption as defined in claim 1, wherein the inclined pipe separator consists of a multiplicity of inclined pipes installed between the main body casing and the guide plate, 1.5~3.5 m below the upper end of the reactor; a diameter of each inclined pipe is 50~80 mm; each pipe has a 45°~60° inclination angle and is 0.8~1.2 m in length; a surface loading rate of the inclined pipe separator is 1.5~3.5 $m^3/(m^2 \cdot h)$.

* * * * *

UNITED STATES PATENT AND TRADEMARK OFFICE
CERTIFICATE OF CORRECTION

| | | |
|---|---|---|
| PATENT NO. | : 8,758,608 B2 | Page 1 of 1 |
| APPLICATION NO. | : 14/117486 | |
| DATED | : June 24, 2014 | |
| INVENTOR(S) | : Chao Long et al. | |

It is certified that error appears in the above-identified patent and that said Letters Patent is hereby corrected as shown below:

DRAWING

Please insert --FIG. 1-- under figure

Signed and Sealed this
Seventh Day of October, 2014

Michelle K. Lee
*Deputy Director of the United States Patent and Trademark Office*